United States Patent [19]
Deale

[11] 3,839,794
[45] Oct. 8, 1974

[54] SHEARS
[76] Inventor: John W. Deale, 5225 Glenoaks, Baton Rouge, La. 70811
[22] Filed: May 25, 1973
[21] Appl. No.: 363,852

[52] U.S. Cl. .............................................. 30/248
[51] Int. Cl. ........................................... B26b 13/26
[58] Field of Search ............ 30/248, 252, 192, 244, 30/259, 257

[56] References Cited
UNITED STATES PATENTS
| | | | |
|---|---|---|---|
| 1,585,572 | 5/1926 | Takacs | 30/248 |
| 2,292,271 | 8/1942 | Heise | 30/252 |
| 3,596,355 | 8/1971 | Wertepny | 30/252 |

*Primary Examiner*—Al Lawrence Smith
*Assistant Examiner*—J. C. Peters
*Attorney, Agent, or Firm*—William David Kiesel

[57] ABSTRACT

Metal cutting shears designed for intricate design, close wall cutting and cutting in difficult to reach areas is provided having a blade and handle construction enabling not only shorter cutting radiuses and closer surface cutting abilities, but also enabling cutting in formerly inaccessible places.

2 Claims, 6 Drawing Figures

3,839,794

SHEARS

FIELD OF THE INVENTION

This invention relates to shears and, more particularly, aviation shears.

BACKGROUND OF THE INVENTION

Since the use of tin and other metals in construction, sheet metal shears have been the main stay in the construction industry for cutting such metals. Their importance has lead to the development of very specialized types of sheet metal shears. For instance, there are shears designed to cut along a straight line. Typical such shears can be seen in U.S. Pat. Nos. 306,758, 827,531 and 1,357,437. Another type of shear and the one to which this invention is directed is commonly known as the aviation shears. Their prime purpose or function is to cut irregular designs or holes in sheet metal. They are also particularly useful in trimming close to wall surfaces and other such areas. They are distinguished primarily by their blade construction which is designed to cut non-linear patterns in sheet metal.

While there have been many improvements in aviation shears, particularly the utilization of a compound cutting action, present designs are still not satisfactory for cutting very small radii or for trimming close to wall structures and other such areas. Furthermore, many of the aviation shear designs today are unable to cut around certain types of corners which are partially hidden by side walls.

SUMMARY OF THE INVENTION

It is an object of this invention to provide shears for cutting irregular designs and holes and for close trimming of wall surfaces, which allow for easier cutting of the small radius holes and/or closer trimming near wall surfaces and other such areas.

These and other objects and advantages of this invention will become clear from the ensuing description of the invention.

Accordingly, a pair of shears for cutting irregular designs in holes in metal sheets and for closer trimming to wall surfaces and other such material is provided which comprises cutting blades pivotedly connected together, wherein those blades are shaped to facilitate ease in cutting non-linear patterns, and handles connected to the cutting blade wherein the handles are offset from the plane formed by the cutting blade in the same direction as the cutting direction.

PREFERRED EMBODIMENTS OF THE INVENTION

Figure 1:
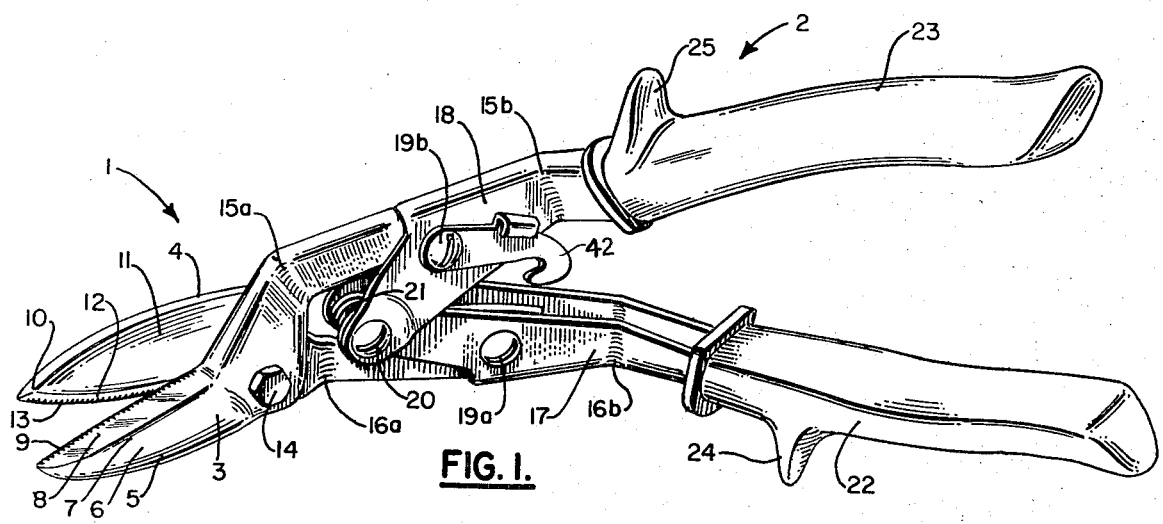
FIG. 1 is a perspective view illustrating one embodiment of this invention wherein the shears are designed to cut to the left of the blade plane.

In a typical aviation shear 1, the cutting blade comprises a cutting member 3 and a shearing member 4. These shears can be designed so that the cutting tendency is either toward the left or the right. Shown in FIG. 1 is an aviation shear which tends to cut to the left. In this illustration cutting member 3 comprises a bottom flat section 5 that leads to a bulging section 6 which begins to steeply slope inward until it reaches guiding area 8 which has a much gentler slope. At the edge of guiding area 8 are serrated ridges 9. The shearing member 4 comprises an upper flat area 10 which bulges in the back (more clearly seen in FIG. 2), which leads into a steeply sloped concave area 11 that is adjacent to a flat shearing surface 12 which also has small shearing ridges 13 located thereon. The blades are attached by bolt 14.

Now, in accordance with this invention, the upper portion of cutting member 3 and the lower portion of shearing member 4 will be bent away from the cutting plane and into the direction which the shears cut. It is preferred that these bends be placed before the position of bolt 20. In this manner there will be no interference with the compound cutting action of shears 1. While this angle of bend can be most any size, it is preferred that this angle of bend be maintained at less than about 60° from the cutting plane in order not to interfere with the cutting. In a still more preferred embodiment, as is seen in FIG. 1, there will not only be a bend made in cutting member 3 and shearing member 4 but that a second bend in lower and upper handles 17 and 18, respectively, will be made. Preferably, this bend should be made behind bolts 19a and 19b, as shown. In such a two-bend embodiment of the invention, it is preferrable that the first bend be between about 10° and 45° out of line with the cutting plane and that the second bend be between about 10° and 60° out of line with the plane of the first bend and in the same direction away from the cutting plane, as is shown in FIG. 1. In this manner the shears will take a more circular appearance which will enable cutting behind previously uncuttable corners.

Figure 1A:
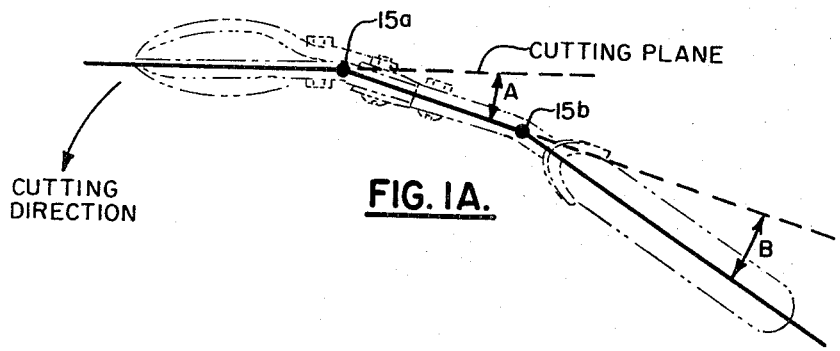
FIG. 1A is a facismile top view of FIG. 1 illustrating the angle of bend in the shears.

The angle of these bends are more clearly seen in FIG. 1A, wherein A is the first anble of bend and B is a second angle of bend. It is, of course, obvious that there could be more than two bends.

Figure 2:
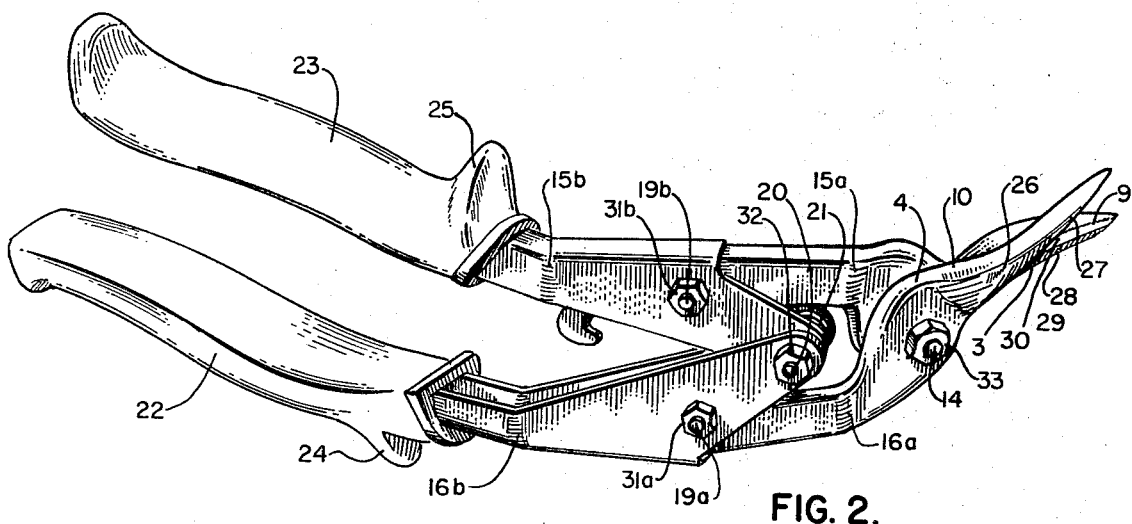
FIG. 2 is a perspective view illustrating the other side of the shears as shown in FIG. 1.

Again looking at FIG. 1, the compound action is provided by having handles 17 and 18 connect to the cutting member 3 and shearing member 4 by bolts 19a and 19b, respectively. Furthermore, handles 17 and 18 are connected by bolt 20 at a pivot point located between the shearing and cutting members. Wrapped around bolt 20 is spring 21 which extends downward into handle 17 and pressing against the upper portion of bolt 19a and upward in handle 18 and pressing against the lower portion of bolt 19b. Handles 17 and 18 are provided with rubber grips 22 and 23, respectively. To operate the shears, one grips the rubber guards 22 and 23 and squeezes, forcing the shearing edge 13 against the cutting edge 9. Because of the particular shape of the baldes and cutting edges shown in FIG. 1 there is a tendency to cut the metal to the left. By offsetting handles 17 and 18 at positions 15a, 15b, 16a and 16b, as shown in FIG. 1, cutting toward the left is greatly facilitated and allows one to cut more easily, smaller radii circles and more intricate patterns. Also, by offsetting the handles as indicated, one may utilize the illustrated aviation shears to more closely trim near wall surfaces and other such areas, such as air conditioner duct outlets in order that the proper length is achieved to receive grills and registers. Turning to FIG. 2 one sees the reverse side of the cutting shears that is shown in FIG. 1. More particularly, one notes that shearing element 3 has a flat surface 28 adjacent to a concave surface 29 that corresponds to bulge area 6. Above the concave surface 29 is a shearing plate 30 which is parallel to cutting plane 12. Shearing element 4 is provided with a bulging and inwardly sloping section 10 which corresponds to the concave surface 11. Below surface 26 is a slightly sloping surface 27 which leads to the shearing edge 13.

Figure 3:
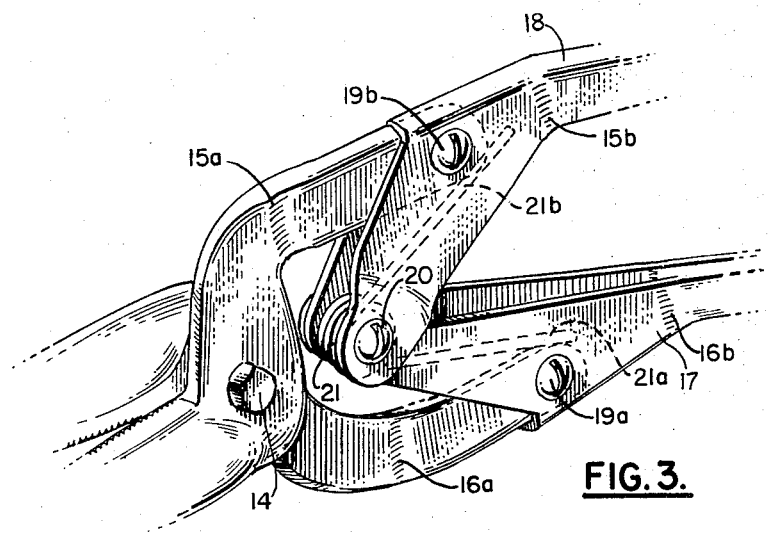
FIG. 3 is a perspective view illustrating the spring position in a compound action pair of shears.

In FIG. 3 the spring arrangement 21 is more clearly illustrated. Spring 21 as indicated before, wraps around bolt 20 and extends into handle 17 until it rests above bolt 19a. On the other side, spring 21 also extends upward into handle 18 until it rests on the underside of bolt 19b. In this manner, after handles 17 and 18 have been squeezed, spring 21 is compressed, and when handles 17 and 18 are released, spring 21 releases to force the handle back into the original position.

Figure 4:
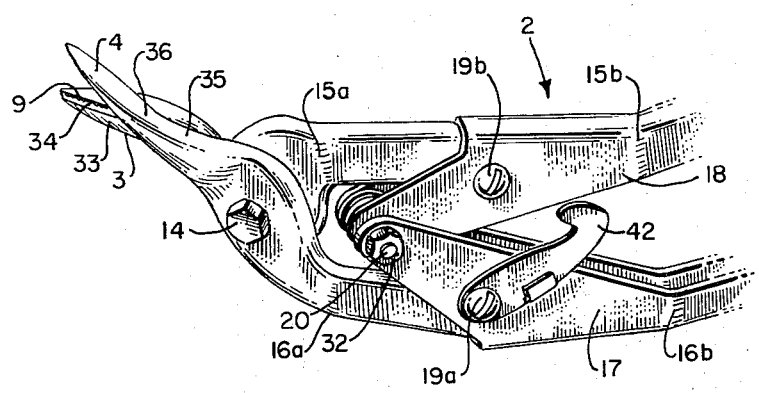
FIG. 4 is a perspective view illustrating a pair of shears according to this invention which cut to the right of the blade plane.
Figure 5:
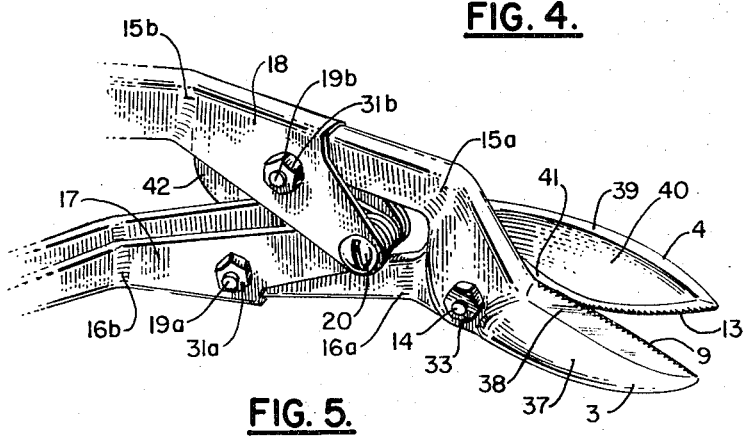
FIG. 5 is a perspective view illustrating the reverse side of these shears as shown in FIG. 4.

In FIG. 4 an aviation shear which has a cutting tendency toward the right is illustrated. In this situation, shearing element 3 has a concave surface 33 which leads to a flat surface 34 which forms part of the cutting plane. As before, the edge of cutting surface 23 is provided with small ridges 9 which facilitate cutting of the sheet metal. The shearing element 4 is provided with an upper about falt area 35 leading to a deep inward sloping surface 36 that consumates into shearing edge 13 which is also provided with small shearing ridges. As before, the cutting blades are connected by pivot 14. In this particular embodiment, cutting and shearing members 3 and 4, as well as handles 17 and 18 are bent at points 15 and 16, respectively, so that the handle is bent in the same direction toward which the shears tend to cut, as is illustrated in FIG. 4. Examining the opposite side of the shears illustrated in FIG. 4, one sees in FIG. 5 that shearing element 3 is provided with a bulging area 37 which corresponds to the opposite concave side 33. Said bulging area slopes upwardly until it reaches a less sloping area 38 that consumates into shearing edge 9. The cutting edge 4 contains an about flat top area 39 which leads to a sharply sloping slightly concave surface 40 which corresponds to the bulging surface 36 and leads to an about falt surface 41 which forms part of the cutting plane.

I claim:

1. Aviation-type shears with one blade having a cutting member and a cutting handle and with a second blade having a shearing member and a shearing handle, said blades being pivotedly connected together at a point to the rear of said cutting and shearing members, said handles being pivotedly connected together further behind said first pivot point, said cutting and shearing members having flat about parallel surfaces forming a cutting plane, said blades being shaped to facilitate use in cutting toward one direction away from said cutting plane, the improvement of which comprises:
   a. offsetting said handles first at a position behind said first pivot point, said first offset being in the same direction as said cutting direction,
   b. offsetting said handles again at a position behind said first pivot point, said second offset being in the same direction as said cutting direction.

2. Aviation-type shears according to claim 1 wherein said first offset is between about 10° and 45° from said cutting plane and offset in said cutting plane direction and wherein said second offset is between about 15° and 60° from said first offset angle and offset in said cutting plane direction.

* * * * *